United States Patent [19]
Grove et al.

[11] 3,841,601
[45] Oct. 15, 1974

[54] FABRICATED BALL VALVE

[75] Inventors: Marvin H. Grove; Kee W. Kim, both of Houston, Tex.

[73] Assignee: M & J Valve Company, Houston, Tex.

[22] Filed: May 18, 1973

[21] Appl. No.: 361,432

Related U.S. Application Data

[63] Continuation of Ser. No. 135,309, April 19, 1971, abandoned.

[52] U.S. Cl............. 251/315, 137/246.22, 251/367
[51] Int. Cl. ......................... F16k 5/06, F16k 27/10
[58] Field of Search............ 251/309, 312, 314–317, 251/367; 29/157.1; 137/246.22

[56] References Cited
UNITED STATES PATENTS

| | | | |
|---|---|---|---|
| 2,890,017 | 6/1959 | Shafer............................ | 251/317 X |
| 3,235,226 | 2/1966 | Allen.............................. | 251/315 X |
| 3,323,537 | 6/1967 | Shafer............................ | 251/315 X |
| 3,348,804 | 10/1967 | Piccardo........................ | 251/367 X |
| 3,656,498 | 4/1972 | Grove et al.................... | 137/246.22 |
| 3,678,556 | 7/1972 | Shafer............................ | 251/315 X |

*Primary Examiner*—Alan Cohan
*Assistant Examiner*—Richard Gerard
*Attorney, Agent, or Firm*—Flehr, Hohbach, Test, Albritton & Herbert

[57] ABSTRACT

A ball valve that is suitable for large pipe sizes (e.g., 20–40 inches or larger). The body is fabricated by welding from mill steel shapes (e.g., plate steel). The main pressure-retaining part of the body is a generally cylindrical shell made from a plurality of segments welded together. At least one and preferably two of the segments are flat plates which are welded to one or two cylindrical segments. The flat plate or plates serve to mount bearing means for journalling the ball. One of the end portions of the body for making connection with associated piping includes an annulus secured to one end of the shell, together with a conical shaped section and a pipe section connected between the annulus and the small end of the conical section. The annulus serves to mount a sealing assembly for the valve.

3 Claims, 7 Drawing Figures

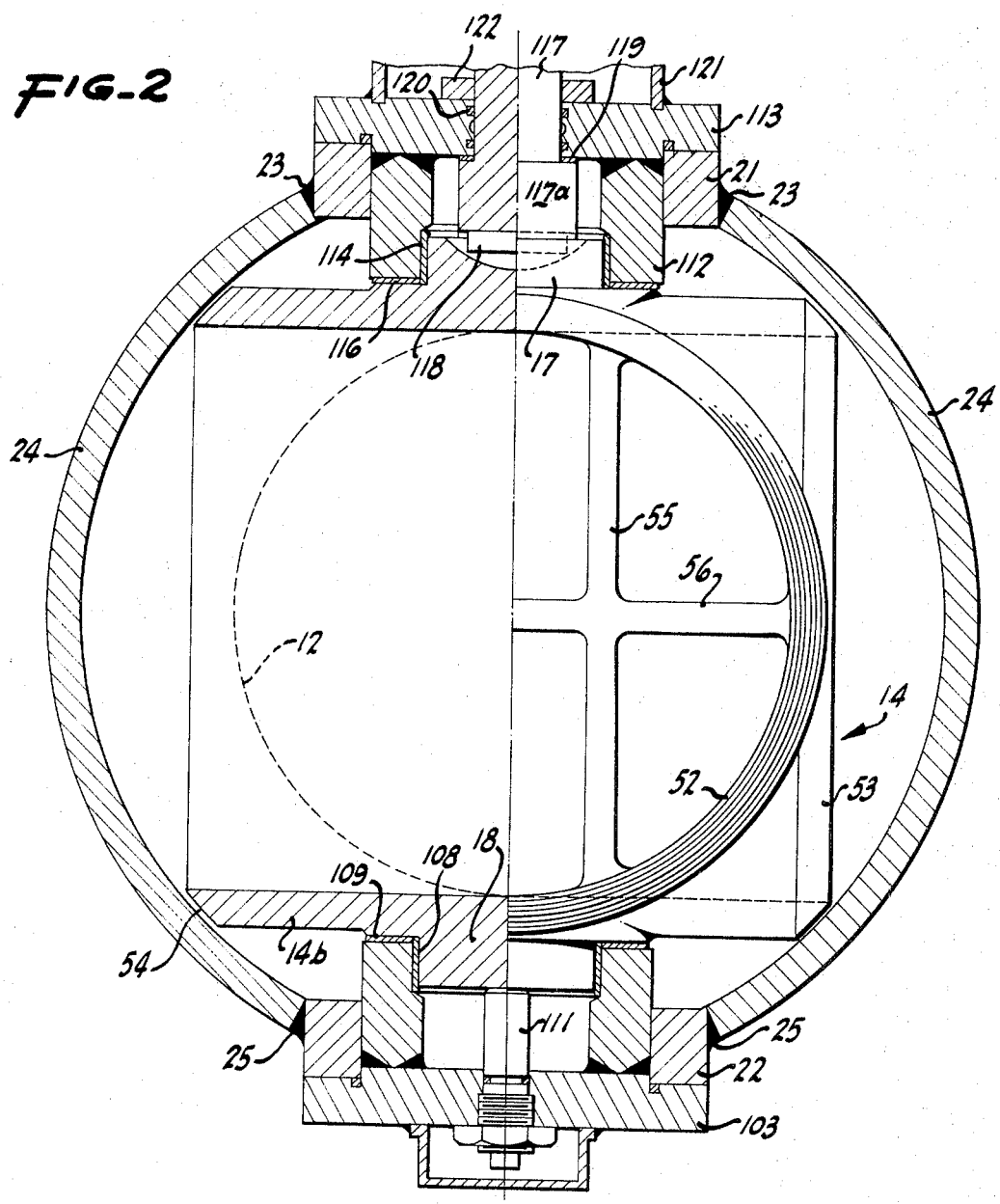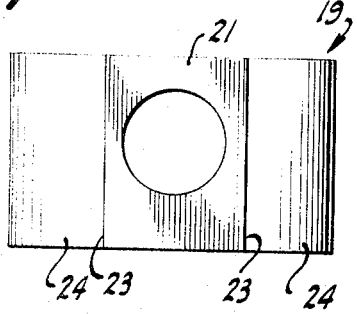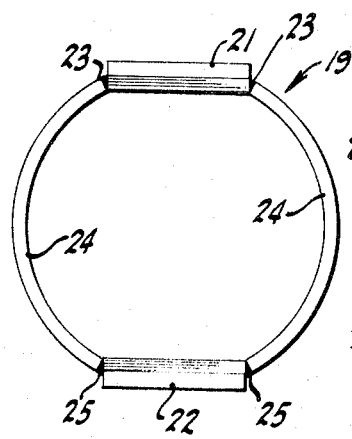

INVENTORS
MARVIN H. GROVE
BY KEE W. KIM

Flehr, Hohbach, Test,
Albritton & Herbert
ATTORNEYS

FABRICATED BALL VALVE

This is a continuation of application Ser. No. 135,309 filed Apr. 19, 1971 and since abandoned.

BACKGROUND OF THE INVENTION

This invention relates generally to valves of the ball type such as are employed for controlling flow of liquids and gases. It is applicable to a wide range of valve sizes, including particularly large valves suitable for pipe transmission lines.

Conventional valves of the ball type are characterized by a rotatable valve member or ball which has a spherical sealing surface, together with sealing assemblies that surround the flow passages of the valve body and which establish sealing engagement with the ball for open and closed positions. Each of the sealing assemblies may include a ring which is fitted within an annular recess formed in the valve body and which is urged by spring means toward the valve ball. In some instances, the valve ball may be free floating between the sealing assemblies, but in most instances the ball is provided with end trunnions which are journalled by bearing means in the upper and lower sides of the body.

Many of the larger ball valves which have been made in the past have bodies which have been made of cast metal. Cast bodies tend to be relatively heavy, particularly when made in the larger sizes and for relatively high pressure services, thus imposing limitations upon overall cost of manufacture. Also cast bodies require expensive patterns if the valves are to be manufactured over a wide range of sizes.

To avoid the difficulties involved in using cast steel bodies for ball valves, the bodies have been made by methods of steel fabrication. However, here again problems have been involved with respect to design considerations and cost of manufacture. It has been found difficult to provide a body design which will comply with required pressure conditions and which can be fabricated from simple steel shapes with simple welding operations, and without providing excess metal which contributes to the weight of the valve. Another problem is to provide proper journalling for the ends of the valve ball, and to properly correlate the means for journalling the ball with the body of the valve. Another problem is to provide proper correlation between the valve bonnet with its sealing means about the rotary operating rod or shaft, and the mounting of the bonnet means upon the fabricated body. The mounting of the sealing assembly for the valve must also be taken into consideration in connection with a fabricated body, because the body construction must facilitate the necessary machining operations to provide a recess for accommodating the sealing assembly.

Aside from the construction of the valve body, the use of two sealing assemblies in the conventional ball valve adds materially to cost of manufacture. Also assembly is difficult because of the necessity of ensuring proper alignment between the ball and the two sealing assemblies for both open and closed positions.

In the past, block-and-bleed has been used in connection with both gate and ball valves to determine if the seals are properly functioning. Here again it has been deemed necessary to employ two sealing assemblies to isolate the body space between the seals. When used on gas lines, block-and-bleed is not generally employed because the discharge of substantial quantities of gas may be required to reduce the body pressure to atmospheric. Even with liquids, the amount of fluid discharged from block-and-bleed may be objectionable.

In view of the above, it is evident that there is need for an improved fabricated body construction for ball valves which will facilitate manufacture and assembly, and which will be economical both with respect to manufacturing and assembly operations, and also with respect to the amount of metal employed. Also there is need for improved sealing means in the larger ball valves, and also means for leak detection which does not have the disadvantages of present block-and-bleed using two sealing assemblies.

SUMMARY OF THE INVENTION

In general, it is an object of the present invention to provide an improved ball valve construction which avoids many of the difficulties of present conventional ball valves.

It is a further object of the invention to provide a ball valve construction which makes use of a fabricated body. In the present invention the main part of the body is a shell that is generally cylindrical in shape, and which is made of segments welded together. At least one of the segments is a plate which serves to carry bearing means for journalling one end of the ball, and which may also serve as a convenient mounting for a bonnet plate. Preferably a second segment is also a plate which carries bearing means for journalling the end of the body.

Another object of the invention is to provide an improved fabricated body for a ball valve which facilitates manufacturing operations and which produces bodies of the desired pressure rating with a minimum amount of metal.

Another object of the invention is to provide an improved ball valve having simplified sealing means, particularly a single sealing assembly carried by the body which establishes a seal between the body and the ball for line flow in either direction.

Another object of the invention is to provide a ball valve having novel means for determining if the sealing means is properly functioning without leakage, while at the same time providing a sealing means which has fluid pressure areas whereby line fluid in either direction does not tend to break the desired seal.

Another object is to provide a ball valve having leak detection with a single sealing assembly.

Additional objects and features of the invention will appear from the following description in which the preferred embodiment has been set forth in detail in conjunction with the accompanying drawing.

BRIEF DESCRIPTION OF THE DRAWING

FIG. 2 is a cross-sectional view taken along the line 2 — 2 of FIG. 1, but with the rotary valve member or ball being only in part section.

FIG. 3 is a plan view of the intermediate shell section of the body.

FIG. 4 is an end view of the shell section of the body.

DESCRIPTION OF THE PREFERRED EMBODIMENTS

Figure 1:
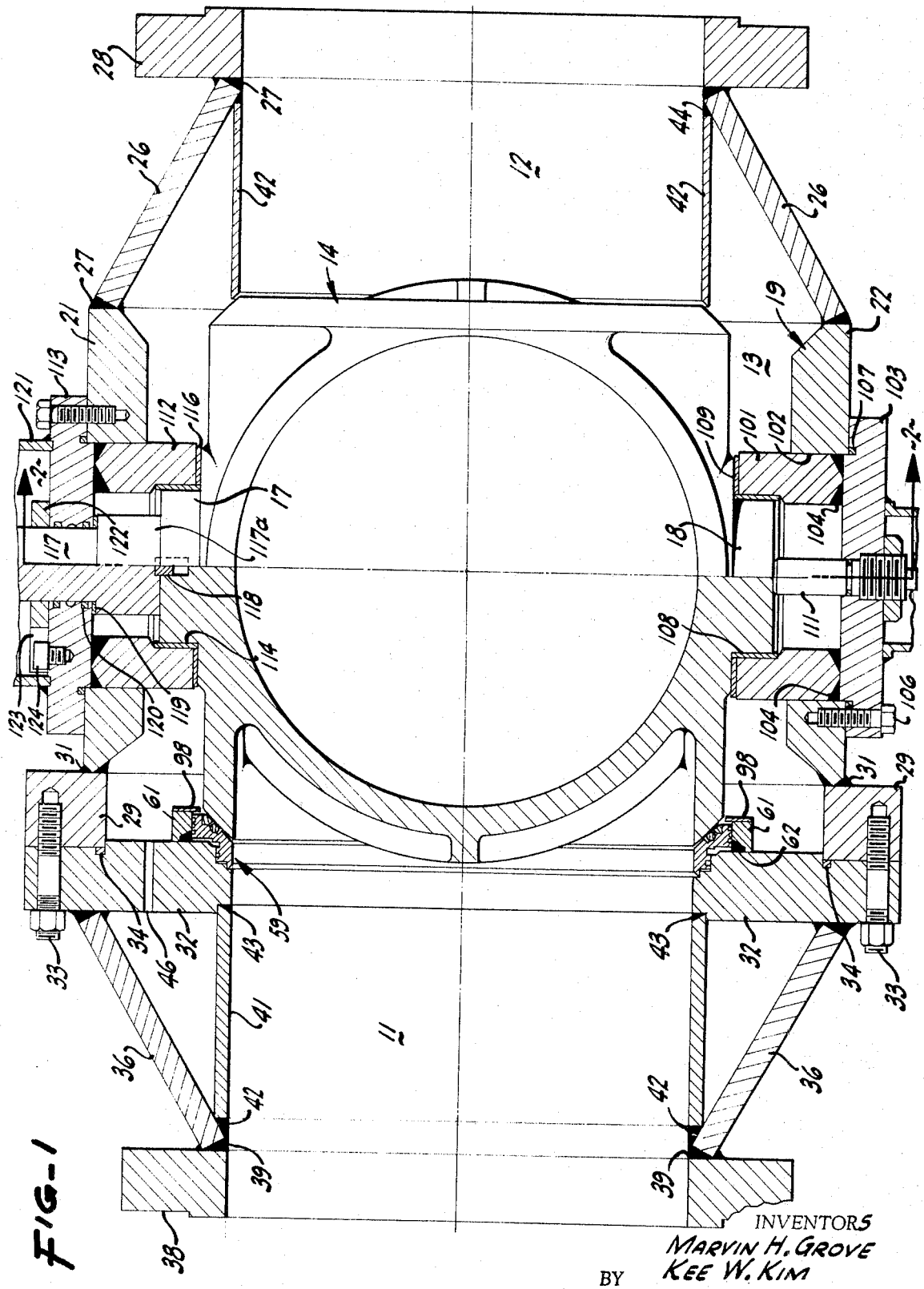
FIG. 1 is a side elevational view in section illustrating a valve made in accordance with the present invention. The body in this instance is in full section, while the rotary valve member or ball is in half section.

The ball valve illustrated in the drawing consists of a body 10 having aligned flow passages 11 and 12 adapted to be connected with associated piping. The body space 13 between the flow passages 11 and 12 is occupied by the rotatable ball or valve member 14. The closed position of the ball 14 is displaced annularly 90° from full open position.

The body 10 is preferably fabricated by welding from steel shapes, as will be presently explained. The ball 14 is shown as a metal casting, although methods of fabrication can be employed. Aligned trunnions 17 and 18 are provided together with journalling means to permit rotation of the ball between its operating positions. The trunnions and associated journalling means carry the thrust of line pressure when the valve is closed and during opening and closing operations.

The main part 19 of the body is in the form of a substantially cylindrical shell. It is made from a plurality of segments that are secured together by welding along spaced parallel longitudinally extending weld connections. One of the segments of the shell is in the form of a flat plate 21 which serves to carry means for journalling the upper trunnion 17 of the ball. Preferably one additional segment 22 is likewise in the form of a flat plate extending parallel to the plate 21. The plate 22 serves to mount means for journalling the lower trunnion 18 of the ball.

As shown in plan view FIG. 3, the upper plate 21 is rectangular and has its longitudinal edges joined by weld connections 23 with the adjacent cylindrical segments 24. As shown in FIG. 4, the lower edges of the cylindrical segments 24 are connected to the longitudinal edges of the lower flat plate 22 by weld connections 25. The entire shell as assembled is substantially cylindrical shaped and forms an effective pressure vessel.

The fabricated body also includes end portions which facilitate making connections with associated piping. For one end of the body we have shown a frusto-conical shaped section 26 which is secured to the cylindrical shell section by weld connection 27. The smaller end of section 26 is secured as by welding 27 to the pipe coupling flange 28.

At the other end of the body we have shown an annulus 29 which is secured to the adjacent end of the shell by weld connection 31. Another annulus 32 is removably secured to annulus 29 by suitable means such as bolts 33. Suitable means such as a seal 34 of the O-ring type serves to prevent leakage between parts 29 and 32. Another frusto-conical section 36 is shown secured to annulus 32 by welding 37, and the smaller end of section 36 is secured to a pipe coupling flange 38 by weld connection 39. The circular opening 40 through the annulus 32 has the same diameter as the opening through coupling flange 38. Flow characteristics are improved by a pipe section 41 which extends between the weld connection 39 and the annulus 32, and is attached to these parts by welding 42 and 43. At the other end of the valve there is a similar light pipe section 42 having its one end attached to the smaller end of the frusto-conical section 26 by welding 44. Annulus 32 is provided with one or more pressure equalizing ducts 46 whereby the pressures on the sides of annulus 32 are always equal.

Figure 6:
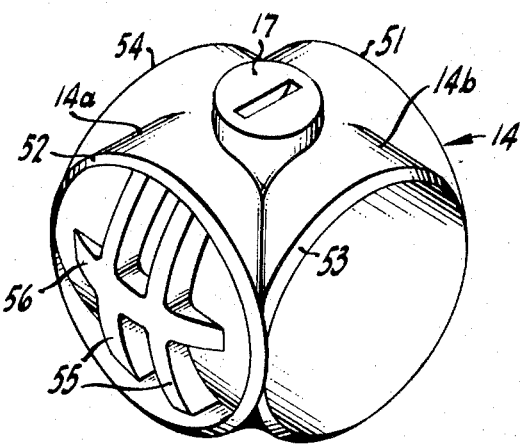
FIG. 6 is a perspective view illustrating the construction of the valve ball.

The ball 14 illustrated in FIG. 1 is shown in detail in FIG. 6. It is formed of annular wall portions 14a and 14b which in general conform to two cylinders intersecting with each other at right angles. A valve surface 51 is formed on the end of one of the portions 14a and conforms generally to the surface of a sphere generated about the center of the ball. A similar surface 52 may be formed on the other portion 14a, or such surface may be omitted to simplify machining. The portion 14b is shown provided with surfaces 53 and 54 which may be coincident with the same sphere as that to which surface 51 is coincident. However, since surfaces 53 and 54 are not required to have a sealing function, it is preferable that they be coincident with a sphere of slightly lesser diameter. Arcuate reinforcing ribs 55 and 56 are shown on the barrier walls 57 which close the ends of portion 14a.

Figure 5:
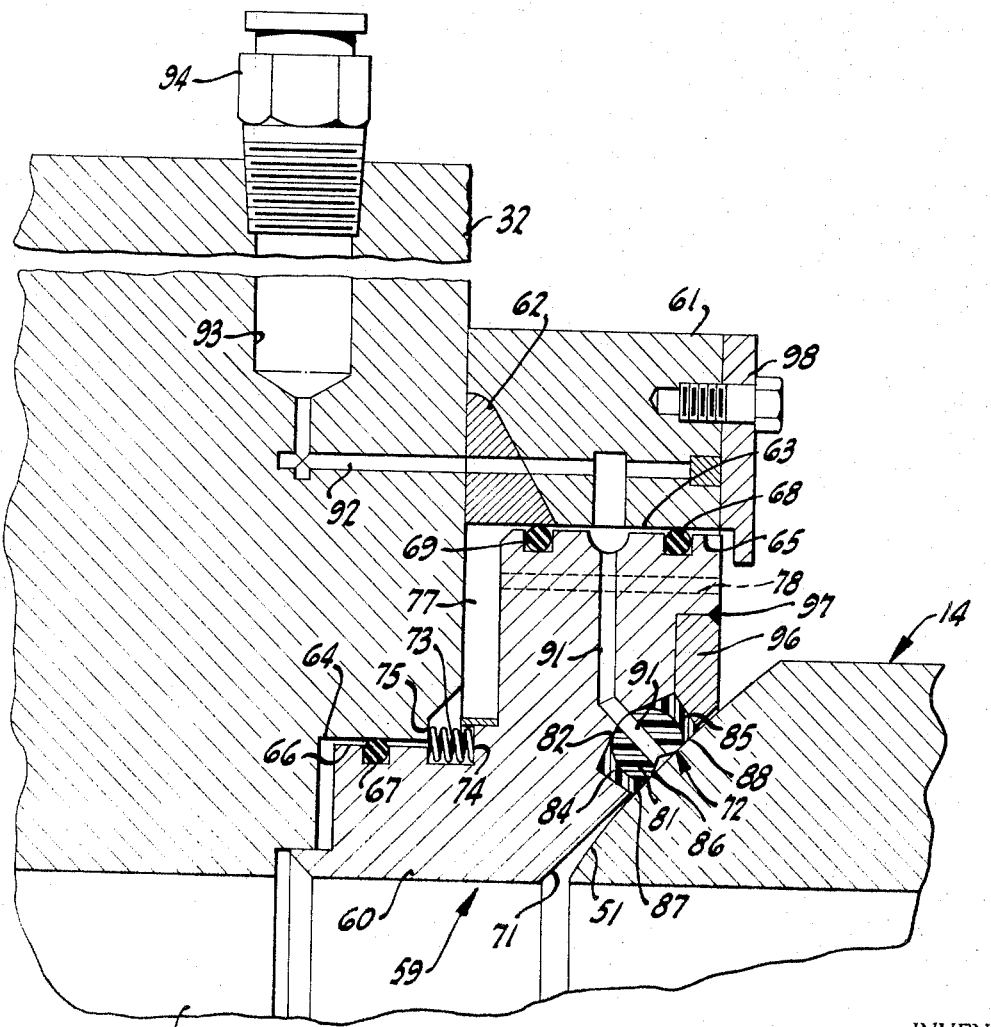
FIG. 5 is an enlarged detail in section illustrating the construction of the sealing assembly.
Figure 7:
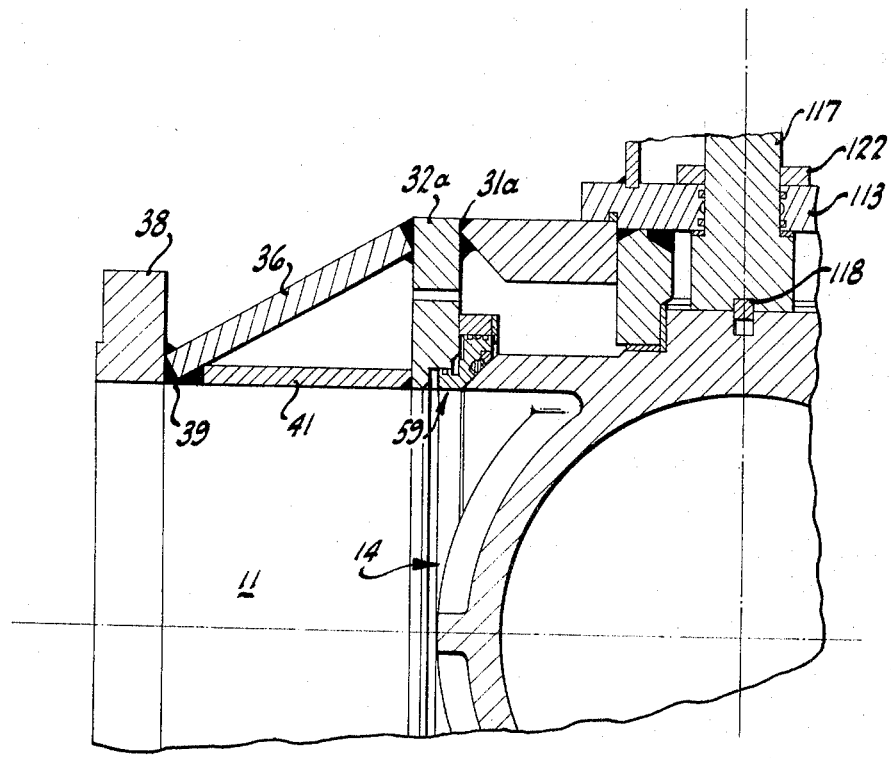
FIG. 7 is a side elevational view in cross section showing another embodiment of the invention.

A single sealing assembly 59 (see FIG. 5) is carried by the body annulus 32 and is arranged to surround the flow passage 11. The assembly consists of a ring 60 that is relatively rigid and made of suitable material such as metal. Immediately surrounding the annulus 60 there is an annular rib 61 which is secured to the adjacent inner face of the annulus 32 by welding 62. The annulus 60 is slidably fitted within a recess which is formed to provide two concentric cylindrical surfaces 63 and 64, on two diameters. The ring 60 is formed with a larger cylindrical surface 65 which slidably fits within the surface 63, and a smaller cylindrical surface 66 which slidably fits within the surface 64. Suitable sealing means 67, such as one of the resilient O-ring type, is carried by the ring 60 and prevents leakage between the surfaces 64 and 66. Also sealing means 68 and 69, which again may be sealing means of the resilient O-ring type, is carried by the ring 60 and prevents leakage between the surfaces 63 and 65. Seals 68 and 69 are spaced apart as illustrated, whereby they seal in two spaced regions. The surface 71 of ring 60, which normally is adjacent to the valve surface 51, is made to conform with the surface of a cone as illustrated. The ring 60 is provided with an insert assembly 72 made of nonmetallic resilient material, and this assembly establishes sealing engagement with the adjacent valve working surface 51 of the ball.

Spring means is provided for normally urging the ring 60 toward the ball. In this instance, compression springs 73 are distributed circumferentially about the annular recess which accommodates ring 60, with one end of each spring engaging the annular ring shoulder 74, and the other end engaging the shoulder 75 formed on the body.

With a sealing assembly as described above, it is evident that an annular space 77 is formed within the body recess between the seals 67, 68 and 69. This space is in free communication with the body space 13 through one or more ducts 78 formed in the ring 60.

The insert assembly 72 preferably is constructed as disclosed and claimed in U.S. Pat. Nos. 3,746,303 and 3,641,542. More specifically, it can consist of a rod or bar 81 which is bent in the form of a hoop or ring, and which is made of relatively hard synthetic material such as nylon or Teflon. In general, this material can have a durometer hardness of the order of 85 to 90 (D scale).

The nylon ring is accommodated within a recess 82 formed within the metal ring 60, and its inner and outer peripheral surfaces are engaged by the compressed and more resilient annular members 84 and 85. These members can be made of suitable synthetic rubber and may, for example, have a durometer hardness of the order of 60 – 85 (A scale). The exposed face 82 of the nylon insert is generally parallel to the conical surface 71 of the ring 60, but is offset forwardly a slight distance. The end faces 87 and 88 of the more resilient insert members 84 and 85 are likewise finished whereby they conform to a conical surface parallel to the surface 71 but offset a slight distance beyond the surface 86.

With an insert assembly as described above, the annular surfaces formed by the faces 87 and 88 of the more resilient insert members 84 and 85 are normally somewhat compressed, and for closed valve position they are urged into sealing engagement with the valve working surface 51 of the ball. The sealing contacts are established along two spaced concentric annular areas. It is desirable to provide means which permits communication from the exterior of the valve body with the space between the two concentric sealing areas. For this purpose a duct 91 is shown which extends through the nylon ring 81 and terminates in communication with the space between the two resilient O-rings 67 and 68. The latter space is in turn in communication with duct 92 in the body, and this duct communicates with the larger bore 93. Bore 93 may normally be closed by a plug, or may be closed by a fitting 94 usable for introducing a suitable plastic sealant. Assuming introduction of a plastic sealant under pressure, it will be evident that the sealant will be applied through the duct 91 and through the insert assembly 72 into the space between the faces 87 and 88 of the resilient insert members 84 and 85, thus ensuring an effective seal.

To facilitate introduction of the insert assembly 72 into the metal ring 60, it is desirable for one side of the accommodating recess to be formed by the separate ring 96. This ring can be applied (with a force fit) after the insert assembly has been properly positioned, with sufficient force to ensure proper compression of the members 84 and 85. Ring 86 can be held in place by welding 97. After assembly of the sealing means within the valve, a plurality of circumferentially spaced keeper lugs 98 can be secured to the rib 61 for the purpose of limiting the projected position of the sealing assembly when it is partially or completely disengaged from the adjacent surface of the ball.

The means employed for journalling the lower trunnion 18 of the ball consists of an annular member 101 which is fitted within a circular opening 102 formed in the plate 22. Member 102 is secured to an exterior closure plate 103 by welding 104, and is held in place by clamping bolts 106 or other suitable means. Sealing means 107, such as means of the resilient O-ring type, is provided to prevent leakage between plate 22 and the exterior cover plate 103. A bearing bushing 108 is shown interposed between the outer periphery of trunnion 18 and the cooperating cylindrical opening formed in member 101, and may be made of suitable material such as Teflon. In place of such a bushing we may employ a bearing assembly, such as one of the roller or needle type. Another thrust bearing annulus 109, which likewise may be made of Teflon, is shown interposed between the inner end face of member 101 and the adjacent shoulder formed on the ball.

To facilitate alignment of the ball within the body, I have shown an adjustable abutment pin 111 which is threaded in the closure plate 103. This pin may be adjusted to position the ball in alignment with the sealing assembly.

The means for journalling the upper trunnion 17 is as follows. The upper plate 21 is bored to receive the annular member 112 which is secured as by welding to the bonnet plate 113. A bushing 114 carried by member 112 serves as a bearing for the trunnion 17, together with the annulus 116. Both the bushing 114 and annulus 116 can be made of Teflon. The bonnet plate 113 is bored to accommodate the operating rod or shaft 117, the lower portion 117a of which is coupled to the ball as by means of a coupling lug 118. Suitable sealing means 120, such as means of the nylon disk or resilient O-ring type, prevents leakage between the rod or shaft 117 and the bonnet plate. The outward thrust of pressure against the shaft 117 may be accommodated by the thrust bearing annulus 119.

The bonnet plate 113 may likewise mount an annular member 121 which in turn may be employed for mounting a suitable operator (e.g., hydraulic, pneumatic, electric or manual).

Suitable means can be employed to provide stops for limiting turning movement of the shaft 117 between 90°. Thus a plate 122 can be keyed to the shaft and provided with an arcuate slot 123 which engages the head of screw 124. The arcuate slot 123 is dimensioned to permit 90° movement.

The valve can be assembled as follows. Assuming that the various parts of the body have been constructed by welding and the ball machined, the ball is introduced into the body while the annulus 32 and its associated parts are removed. At that time the annular members 101 and 112 are retracted, thus permitting the ball to be placed in substantially its final position. The annular members 101 and 112 are then applied together with the cover plates 103 and 113, and these plates bolted to the mounting plates 22 and 21.

The sealing assembly is separately assembled together with the annulus 32, and then this assembly is bolted to the annulus 29 by bolts 33. Thereafter pin 111 can be adjusted to secure and retain the desired alignment. The shaft 117 is pre-assembled together with annular member 112 and bonnet plate 113, and the shaft is coupled to the trunnion 17 as the assembly is seated in final position upon the plate 21. In the final position of the ball with all parts assembled, the surface 51 is in engagement with the insert assembly 72, with the ring 60 being moved part way into its accommodating recess and with a substantial amount of compression of spring 73. When properly assembled, the alignment of the ball should be such that when the ball is rotated 90° between full open and closed limiting positions, the annular valve working surface 51 of the ball is brought into proper alignment and sealing relationship with the insert sealing assembly 72. For full open position, the port 16 in the ball registers with the flow passages 11 and 12.

As previously explained, the sealing assembly described above provides sealing contacts on two spaced concentric annular areas formed by the faces 87 and 88 of the resilient members 84 and 85. A characteristic of this assembly is that when subjected to a pressure differential from the flow passage 11, a pressure holding seal is formed by the face 87 of resilient member 84. Under such conditions the seal formed by the face 88 on member 85 is self-relieving in that it will not hold any substantial pressure differential applied to its inner periphery. On the other hand, if a pressure differential is applied in the body space 13, then a pressure seal is formed by the face 88 of resilient member 85 while the face 87 of resilient member 84 is self-relieving.

Although the valve described above is bidirectional insofar as line flow is concerned, the sealing assembly 72 will maintain a seal with the ball under all operating conditions. Assuming that the left-hand side of the valve as shown in FIG. 1 is the upstream or high pressure side, the fluid pressure area presented by the sealing assembly is such that the ring 60 is urged toward the right against the ball. That is because the diameter of the cylindrical surface 64 of the body corresponds with the mean diameter between the sealing areas established by the faces 87 and 88 of the resilient members 84 and 85, and is greater than the diameter of face 87 of member 84. Also it is because of the self-relieving action of the face 88 under such conditions. Likewise, if the righthand side of the valve as shown in FIG. 1 represents the upstream or high pressure side, the fluid pressure area presented by the ring 60 will again tend to urge the ring against the ball. This is because the diameter of the cylindrical surface 64 is slightly less than the diameter of the sealing areas established by the face 88 of insert member 85, and because face 87 is self-relieving. Therefore, under all operating conditions fluid pressure tends to urge the sealing assembly against the ball, and in addition the sealing assembly is at all times urged toward the ball by the compression springs 73. The force of these springs is sufficient to establish initial sealing engagement with the ball under no or low pressure conditions.

Under operating conditions the ball can be rotated 90° between full open and closed conditions without excessive torque. During such movements any gritty solids which may be associated with the sealing assembly are given an opportunity to be dislodged into the fluid flow. Thus wear upon the valve surfaces is maintained at a minimum. Because of the configuration presented by the valve member, as distinguished from a ball having a continuous spherical surface, there is ample space about the ball for flow of line fluid as the ball is being rotated between closed and open positions. Also the clearance between the sealing assembly and the ball for open position permits some line flow about the ball. This flushes out any solids tending to accumulate around the ball, with the result that such solids do not accumulate to the extent that the ball becomes locked against or requires excessive torque for rotation.

In the event the valve surface 51 should become worn because of abrasion or erosion, the limiting stops can be reset to permit operation of the ball between limits which bring the other surface 52 into engagement with the sealing assembly for closed position, assuming that surface 52 has been machined for this purpose.

The ribs 55 and 56 are generally considered desirable, particularly for valves made in the larger sizes. They serve to reinforce the barrier wall of the ball surrounded by the valve surface 51.

If under operating conditions it is desired to determine if the sealing assembly is leaking, the bore 93 is vented momentarily to atmosphere and then connected with a pressure indicator to detect any rise in pressure. Any such pressure build-up between the concentric sealing areas indicates a leak. Pressure build-up for such indication is less than that required to effect the self-relieving action described above.

The construction described above avoids many of the difficulties inherent with conventional fabricated ball valves. The configuration of the body is such that it is ideally suited to act as a pressure vessel. The construction makes possible economy in the use of metal, whereby the weight of the completed valve is not excessive. The ball can be readily assembled and aligned within the body, thus facilitating manufacture. Only one sealing assembly is employed, and this is assembled outside of the body and then applied together with the annulus 32 during final assembly. This not only facilitates assembly, but in addition facilitates repair and replacement of the sealing assembly after the valve has been in service. No pressure differential is applied to annulus 32 because of the pressure equalizing ducts 46.

In some instances it may be desirable to eliminate the bolting of annulus 32 to the shell of the body, and to provide a fully welded body construction. Thus as shown in FIG. 6, the annulus 29 of FIG. 1 has been omitted, and the annulus 32a corresponding to the annulus 32 of FIG. 1 is directly connected by welding 31a to the shell of the body. The shell in FIG. 6 is indicated as lengthened somewhat over the dimension shown in FIG. 1, to accommodate for elimination of the annulus 29.

When a valve construction as shown in FIG. 6 is assembled, the sealing assembly again is assembled together with the annulus 32a and associated parts, and after the ball has been positioned within the body, the annulus 32a is applied in proper position and then secured to the shell by welding 31a.

We claim:

1. In a valve of the rotary ball type, a valve body having flow passages adapted to be connected to associated piping, a rotatable ball valve member within the body having a port adapted to register with the flow passages for open position of the valve, the body including a main part in the form of a cylindrical pressure resisting shell surrounding the ball and generally annular in transverse section, the shell being formed of a plurality of segments secured together by spaced longitudinal parallel weld connections, one segment being a flat mounting plate of uniform thickness disposed between the longitudinal edges of two adjacent segments, said two adjacent segments having a uniform wall thickness and being segments of a cylinder; said plate extending the length of the shell and having its longitudinal parallel edges welded to the edges of the adjacent segments, aligned trunnion means on the ends of the ball, bearing means carried by the mounting plate and serving to journal one of said trunnion means within the shell, additional bearing means for journalling the other trunnion means, the body also including end portions secured to the ends of the segments of the main body part for making connection with associated piping, one of said end portions comprising an annulus secured to the corresponding end of the shell, said annulus serving to mount sealing means forming a fluid-tight valve seal between the ball and the body for closed position of the valve, a conical shaped section having its large end secured to the outer margin of said annulus by welding, and a cylindrical pipe section disposed within the conical section and having its one end secured to the small end of the conical section by welding and having its other end secured to the annulus by welding, said annulus having a pressure equalizing duct extending through the same to establish communication between the space surrounding the sealing means and the space between the conical and cylindrical sections.

2. A valve construction as in claim 1 in which another segment of the shell is another flat mounting plate of uniform thickness parallel to the first plate and having parallel longitudinal edges welded to said two segments and serving to carry the last named journal means.

3. In a valve of the rotary ball type, a valve body having flow passages adapted to be connected to associated piping, a rotatable ball valve member within the body having a port adapted to register with the flow passages for open position of the valve, the body including a main part in the form of a cylindrical pressure resisting shell surrounding the ball and generally annular in transverse section, aligned trunnion means on the ends of the ball, bearing means carried by the body and serving to journal said trunnion means, means forming a fluid-tight valve seal between the ball and the body for closed position of the valve, means secured to one end of the main part of the body for coupling the same to associated piping and for mounting said sealing means, said means comprising an annulus secured to said one end of the shell, said annulus serving to mount said sealing means, a conical shaped section having its large end secured to the outer margin of said annulus by welding, a cylindrical pipe section disposed within the conical section and having its one end secured to the small end of the conical section by welding and having its other end secured to the annulus by welding, said annulus having a pressure equalizing duct extending through the same to establish communication between the body space surrounding the sealing means and the space between the conical section and the cylindrical pipe section.

* * * * *